(12) United States Patent
Ghaoud et al.

(10) Patent No.: US 6,832,179 B2
(45) Date of Patent: Dec. 14, 2004

(54) EVALUATING A VORTEX FLOW-METER SIGNAL

(75) Inventors: Tarek Ghaoud, Oxford (GB); David W. Clarke, Oxford (GB)

(73) Assignee: Invensys Systems, Inc., Foxboro, MA (US)

(*) Notice: Subject to any disclaimer, the term of this patent is extended or adjusted under 35 U.S.C. 154(b) by 160 days.

(21) Appl. No.: 10/177,757

(22) Filed: Jun. 24, 2002

(65) Prior Publication Data

US 2003/0028334 A1 Feb. 6, 2003

Related U.S. Application Data

(60) Provisional application No. 60/300,421, filed on Jun. 26, 2001.

(51) Int. Cl.[7] ................................................. G06F 11/30
(52) U.S. Cl. ........................................ 702/189; 324/222
(58) Field of Search ........................... 702/189, 12, 45, 702/46, 47–49, 79; 324/306, 222

(56) References Cited

U.S. PATENT DOCUMENTS

| | | | |
|---|---|---|---|
| 3,709,034 A | | 1/1973 | Herzl ........................ 73/194 B |
| 4,069,713 A | | 1/1978 | Gassmann ................ 73/861.28 |
| 4,123,940 A | | 11/1978 | Herzl et al. ............... 73/861.24 |
| 5,121,639 A | * | 6/1992 | McShane .................. 73/861.06 |
| 5,570,300 A | | 10/1996 | Henry et al. .................. 702/45 |
| 5,602,346 A | | 2/1997 | Kitami et al. | 
| 6,140,952 A | | 10/2000 | Gaboury |
| 6,408,700 B1 | | 6/2002 | Matt et al. |
| 6,598,004 B1 | * | 7/2003 | Ishida et al. .................. 702/69 |
| 6,606,916 B2 | * | 8/2003 | Bignell et al. ............ 73/861.27 |
| 2002/0129661 A1 | | 9/2002 | Clarke et al. ............. 73/861.22 |

FOREIGN PATENT DOCUMENTS

GB    1551220    8/1979

OTHER PUBLICATIONS

Model 8800C Smart Vortex Flowmeter, Product Data Sheet, 00813–0100–4003, Rosemount Inc. (7 pages).
Model 8800A Vortex Flowmeter with FOUNDATION™ fieldbus, Product Data Sheet, 00813–0100–4772, Rosemount Inc. (8 pages).
Wood, Robert H., et al., "A Phase–Locked Loop for Driving Vibrating Tube Diameters," *Rev. Sci. Instrum.*, vol. 60, No. 3, Mar. 1989, pp. 493–494.
Kutin, Jože, et al., "Phase–Locking Control of the Coriolis Meter's Resonance frequency Based on Virtual Instrumentation," *Sensors and Actuators A: Physical*, 2003, pp. 86–93.

* cited by examiner

*Primary Examiner*—Marc S. Hoff
*Assistant Examiner*—Edward Raymond
(74) *Attorney, Agent, or Firm*—Fish & Richardson P.C.

(57) ABSTRACT

A signal processor, for use with a zero crossing module of a vortex flow meter, includes a peak amplitude detector, a comparator, and a filter module. The filter module is enabled when the comparator determines that the amplitude is less than a low flow rate threshold. The filter module filters a vortex signal and the filtered signal is provided to a frequency estimator that uses a zero crossing algorithm. The signal processor may increase the signal-to-noise ratio at low flow rates for which the frequency estimator may not otherwise be able to accurately estimate the flow rate. Low flow rates may be measured by determining that there is a low flow rate using amplitude detection of a vortex signal, filtering the vortex signal based on the amplitude detection, and using a zero crossing algorithm on the filtered vortex signal.

18 Claims, 7 Drawing Sheets

EVALUATING A VORTEX FLOW-METER SIGNAL

CROSS-REFERENCE TO RELATED APPLICATIONS

This application claims priority from U.S. Provisional Application No. 60/300,421, filed Jun. 26, 2001, and titled "Filtering and Analysis System for Evaluating a Vortex Flow meter System," which is incorporated by reference.

TECHNICAL FIELD

Certain implementations relate generally to evaluating a signal, including analyzing and filtering a signal, and more particularly to analyzing and filtering a vortex flow meter signal.

BACKGROUND

Flow meters may measure the rate of flow of a fluid in a pipe or other pathway. The fluid may be, for example, a gas or a liquid, and may be compressible or incompressible. One type of flow meter is a vortex flow meter which is based on the principle of vortex shedding. Vortex shedding refers to a natural process in which a fluid passing a bluff body causes a boundary layer of slowly moving fluid to be formed along the surface of the bluff body. A low pressure area is created behind the bluff body and causes the boundary layer to roll up, which generates vortices in succession on opposite sides of the bluff body. The vortices induce pressure variations that may be sensed by a pressure sensor. The vortex-shedding pressure variations have a frequency that is related to the flow rate. Accordingly, by measuring the frequency of the pressure variations, the flow rate may be determined.

SUMMARY

One technique for measuring the frequency of vortex-shedding pressure variations includes converting the pressure values into an electric signal and determining the time between zero crossings of the electric signal. The term "vortex signal" is used to refer to the electric signal or, more generally, and depending on the context, to refer to the pressure variations or some other signal derived from the pressure variations. Inverting the time between zero crossings yields the frequency of the vortex signal. However, zero crossings of the vortex signal may be difficult to determine, particularly for low flow rates that may produce pressure variations of a lower magnitude than pressure variations produced for high flow rates. Determining zero crossings may also be difficult in the presence of noise. Noise may be present from, for example, turbulence and "plant noise" such as, for example, pump vibrations and pipe-line vibrations. A lower magnitude for the vortex signal and/or the presence of noise may result in a lower signal-to-noise ratio ("SNR") for the vortex signal at low flow rates. Low SNRs may make it difficult to lock on to the vortex signal and/or to track the vortex signal using a zero crossing technique.

Low flow rates, and the associated low SNRs, may occur, for example, in at least three scenarios. The first scenario may occur when a flow meter has not acquired a lock on the vortex signal because the flow rate is low. For example, at start-up, a flow meter may not know the frequency of the vortex signal and, accordingly, may not filter out any noise due to the possibility that the vortex signal could also be filtered out. The second scenario may occur when a flow meter has acquired a lock on the vortex signal and is able to filter out noise that is not too close to the vortex signal frequency, but still cannot track the vortex signal to a lower flow rate because of the low SNR. The third scenario may occur when a flow meter has acquired a lock and is tracking the vortex signal at a low flow rate, but intermittent noise causes the flow meter to lose the lock and/or to track the noise.

Each of these scenarios, and others, can be addressed by providing the flow meter with additional functionality that determines that a flow rate is low and filters some of the noise out of the vortex signal. The flow rate may be determined to be low, for example, by determining that the amplitude of the vortex signal is low. The flow rate can be determined from the amplitude because the flow rate is directly related to the amplitude. The filtering may be done using, for example, a band-pass filter ("BPF") having one or more pass bands. Filtering the vortex signal to remove noise may increase the SNR of the vortex signal and focus the flow meter on a smaller range of (low) flow values, which may help the flow meter to lock on and/or track the vortex signal.

Using amplitude detection to determine that the flow rate is low may also be more robust to noise than determining zero crossings at low flow rates. Thus, the amplitude detection may be expected to determine that the flow rate is low even when the zero crossing detection cannot. The amplitude detection may also include filtering. For example, an amplitude detector may detect peaks in the vortex signal and these peaks may be filtered to reduce the effect of noise on the peak measurements. In this way, the determination that the flow rate is low may be less likely to be changed inadvertently and to interrupt the corresponding filtering.

According to a general aspect, a signal processor for use with a zero crossing module of a vortex flow meter includes a peak detector, a comparator, and a filter module. The peak detector produces an amplitude estimate. The comparator is coupled to the peak detector and receives the amplitude estimate and a threshold amplitude. The comparator compares the amplitude estimate and the threshold amplitude to produce a comparison result. The filter module is coupled to the comparator and receives the comparison result and a signal. The filter module is operable to selectively filter the signal based on the comparison result and to provide the selectively filtered signal to a zero crossing module.

A peak filter may be disposed between the peak detector and the comparator. The peak filter may filter the amplitude estimates produced by the peak detector to produce a filtered amplitude estimate. The comparison result may indicate whether the amplitude estimate is less than the threshold amplitude, and the filter module may filter the signal using a first pass band if the comparison result indicates that the amplitude estimate is less than the threshold amplitude. The filter module may filter the signal using a second pass band if the first pass band is not used, or regardless of whether the first pass band is used. The second pass band may include a variable pass band that depends on an estimated vortex frequency of the signal. The filter module may include a first filter and a second filter. The first filter may be coupled to the second filter, and may selectively filter the signal using the first pass band. The second filter may selectively filter the signal using the second pass band.

According to another general aspect, a vortex flow meter includes a peak detector, a comparator, a filter module, and a frequency estimation module. The peak detector is operable to produce an amplitude estimate. The comparator is coupled to the peak detector, and receives and compares the amplitude estimate and a threshold amplitude to produce a comparison result. The filter module is coupled to the comparator and includes at least one filter. The filter module receives the comparison result and a signal, selectively filters the signal based on the comparison result, and provides the selectively filtered signal as an output. The frequency estimation module is coupled to the filter module and includes a zero-crossing detector and a frequency estimator. The frequency estimation module receives the selectively-filtered signal, detects zero crossings in the selectively-filtered signal, and estimates a vortex frequency of the selectively-filtered signal based on the detected zero crossings.

A peak filter may be disposed between the peak detector and the comparator. The peak filter may filter the amplitude estimates produced by the peak detector to produce a filtered amplitude estimate. The comparison result may indicate whether the amplitude estimate is less than the threshold amplitude, and the filter module may filter the signal using a first pass band if the comparison result indicates that the amplitude estimate is less than the threshold amplitude. The filter module may filter the signal using a second pass band if the first pass band is not used, or regardless of whether the first pass band is used.

According to another general aspect, processing a vortex signal in a vortex flow meter includes comparing an amplitude of a vortex signal to a threshold amplitude, producing an indication of whether the amplitude of the vortex signal is less than the threshold amplitude, filtering the vortex signal using a first pass band only if the amplitude of the vortex signal is less than the threshold amplitude, filtering the vortex signal using a second pass band if the first pass band is not used, detecting zero crossings of the filtered vortex signal, and estimating a vortex frequency based on the detected zero crossings.

The threshold amplitude may reflect a low flow rate, such that the vortex signal is filtered using the first pass band only if the flow rate is low. The first pass band need not vary with the amplitude of the vortex signal. The threshold amplitude may be adjusted by a hysteresis value. Detecting the amplitude of the vortex signal may include detecting peaks of the vortex signal and filtering the detected peaks to reduce high-frequency components. The amplitude of the vortex signal may include a detected amplitude.

According to another general aspect, determining a flow rate of a fluid includes determining that a flow has a low flow rate by detecting an amplitude of a vortex signal; filtering the vortex signal to reduce a high frequency component based on the determination that the flow has a low flow rate; and determining a flow rate of the flow using a zero crossing algorithm on the filtered vortex signal.

Detecting an amplitude may include detecting peaks in the amplitude of the vortex signal and filtering the detected peaks in the amplitude of the vortex signal to remove a high-frequency component.

The details of one or more implementations are set forth in the accompanying drawings and the description below. Other features will be apparent from the description and the drawings, and from the claims.

DETAILED DESCRIPTION

Architecture

Figure 1:
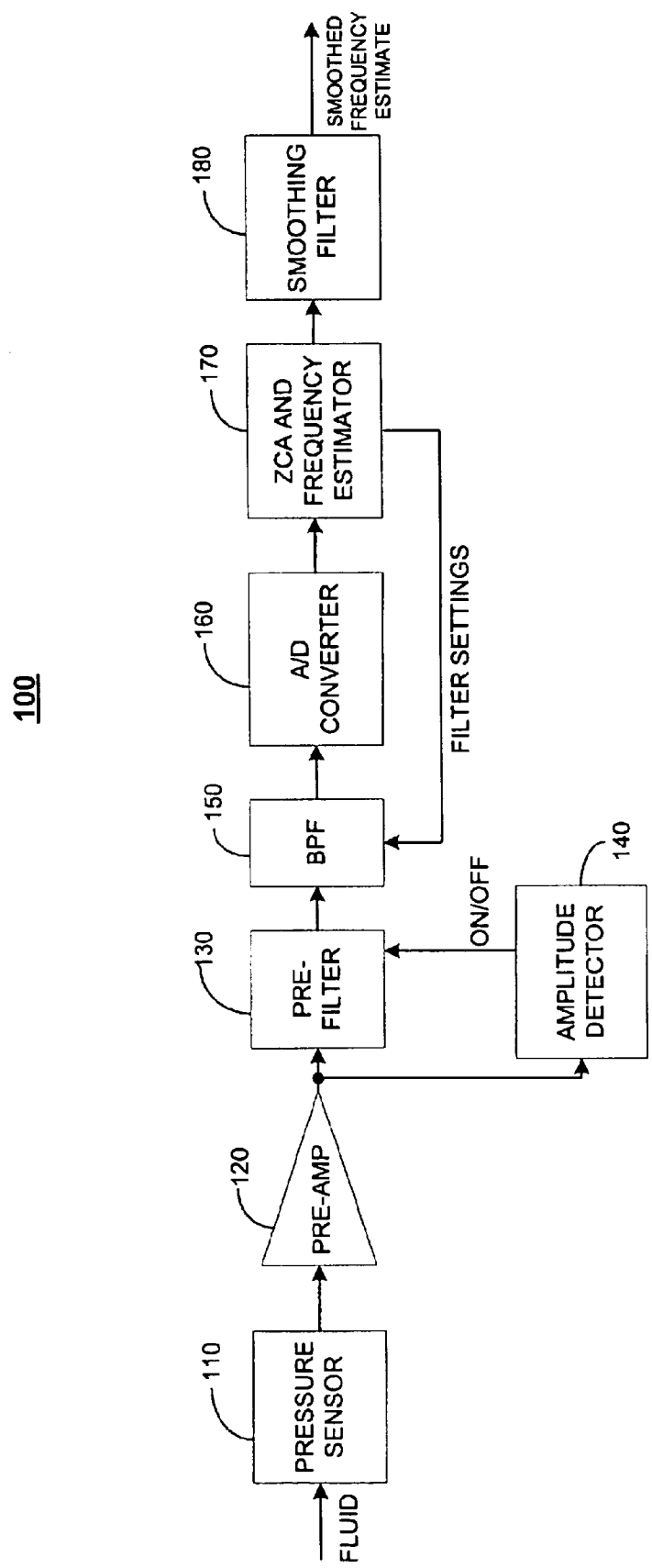
FIG. 1 is a block diagram of an example of a vortex flow meter having a pre-filter and an amplitude detector.

Referring to FIG. 1, a system 100 may be used as a vortex flow meter to measure flow rate using the vortex shedding principle. The system 100 includes a pressure sensor 110 that senses the pressure of a fluid and produces as an output a signal representing the pressure. The output of the pressure sensor 110 is provided to a pre-amplifier 120 that amplifies the signal. The output of the pre-amplifier 120 is provided to both a pre-filter 130 and an amplitude detector 140. If the pre-filter 130 is enabled, the pre-filter 130 filters the input signal to remove noise. If the pre-filter 130 is not enabled, the pre-filter 130 passes the signal through to the output without filtering. The amplitude detector 140 detects the amplitude of the input signal and enables the pre-filter 130 if the detected amplitude is below a threshold value. The output of the amplitude detector 140 thus provides an ON/OFF signal to the pre-filter 130. The output of the pre-filter 130 is provided to a band-pass filter ("BPF") 150, the output of which is provided to an analog-to-digital ("A/D") converter ("ADC") 160. The BPF 150 filters the input signal to remove noise and the ADC 160 converts its input signal from analog to digital. The output of the ADC 160 is provided to a ZCA module 170 that executes a zero crossing algorithm ("ZCA") and estimates a frequency of the vortex signal. The ZCA module 170 provides one or more filter settings to the BPF 150. The output of the ZCA module 170 is provided to a smoothing filter 180. The smoothing filter 180 produces a smoothed frequency estimate and may be coupled to a flow estimator (not shown) that estimates the flow rate of the fluid based on the frequency of the vortex signal.

Figure 2:
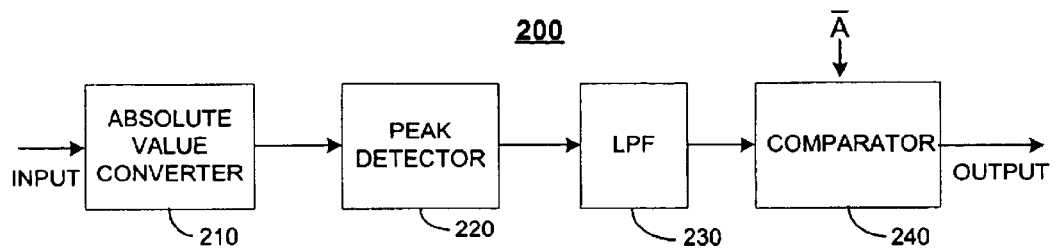
FIG. 2 is a block diagram of an example of the amplitude detector of FIG. 1.

Referring to FIG. 2, a system 200 may be used as the amplitude detector 140 in the system 100. The system 200 includes an absolute value converter 210. The absolute value converter 210 determines the absolute value of an input signal and provides that absolute value as an output to a peak detector 220. The peak detector 220 detects or estimates the peaks in the input signal and provides those peak values, or some representation of them as an output to a low pass filter ("LPF") 230. The LPF 230 filters the input signal and provides the filtered signal as an output to a comparator 240. The comparator 240 also receives a threshold amplitude signal A-bar. The comparator 240 compares the input filtered signal and A-bar and produces an output based on the comparison. The output of the comparator 240 may be used to enable the pre-filter 130 if the filtered input is less than A-bar and to disable the pre-filter 130 otherwise.

Figure 3:
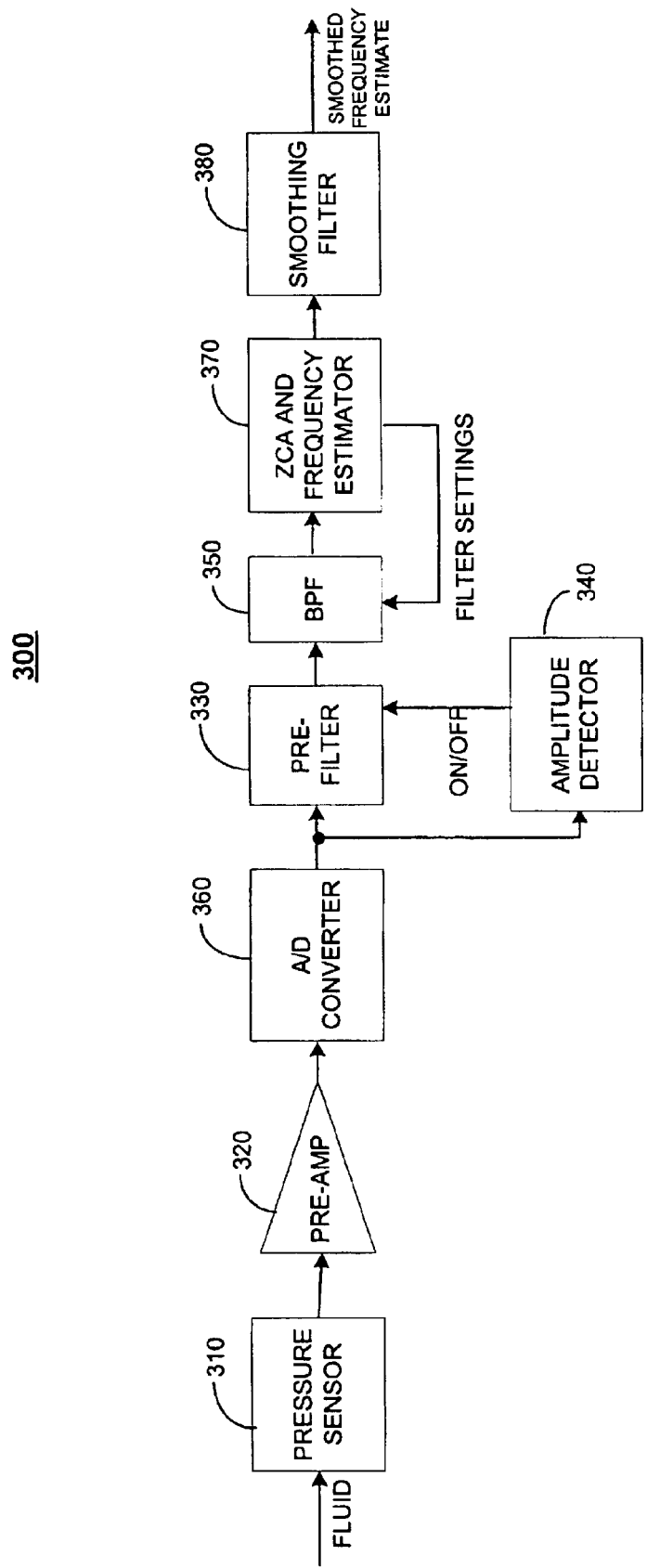
FIG. 3 is a block diagram of a primarily digital implementation of a vortex flow meter.

Referring to FIG. 3, a system 300 may be used as a primarily digital implementation of a vortex flow meter. The system 300 includes a pressure sensor 310 that corresponds to the pressure sensor 110 and provides output to a pre-amplifier 320 that corresponds to the pre-amplifier 120. The output of the pre-amplifier 120 is provided to an ADC 360 that corresponds to the ADC 160. The digital output of the ADC 360 is provided to a pre-filter 330 and an amplitude detector 340 that correspond, respectively, to the pre-filter 130 and the amplitude detector 140. The output of the pre-filter 330 is provided to a BPF 350 that corresponds to the BPF 150 and provides an output to a ZCA module 370 that corresponds to the ZCA module 170. One output of the ZCA module 370 is provided to a smoothing filter 380 that corresponds to the smoothing filter 180, and another output of the ZCA module 370 provides one or more filter settings to the BPF 350. Corresponding components of the systems 100 and 300 are not necessarily identical and need not include the same functionality.

Operation

Figure 4:
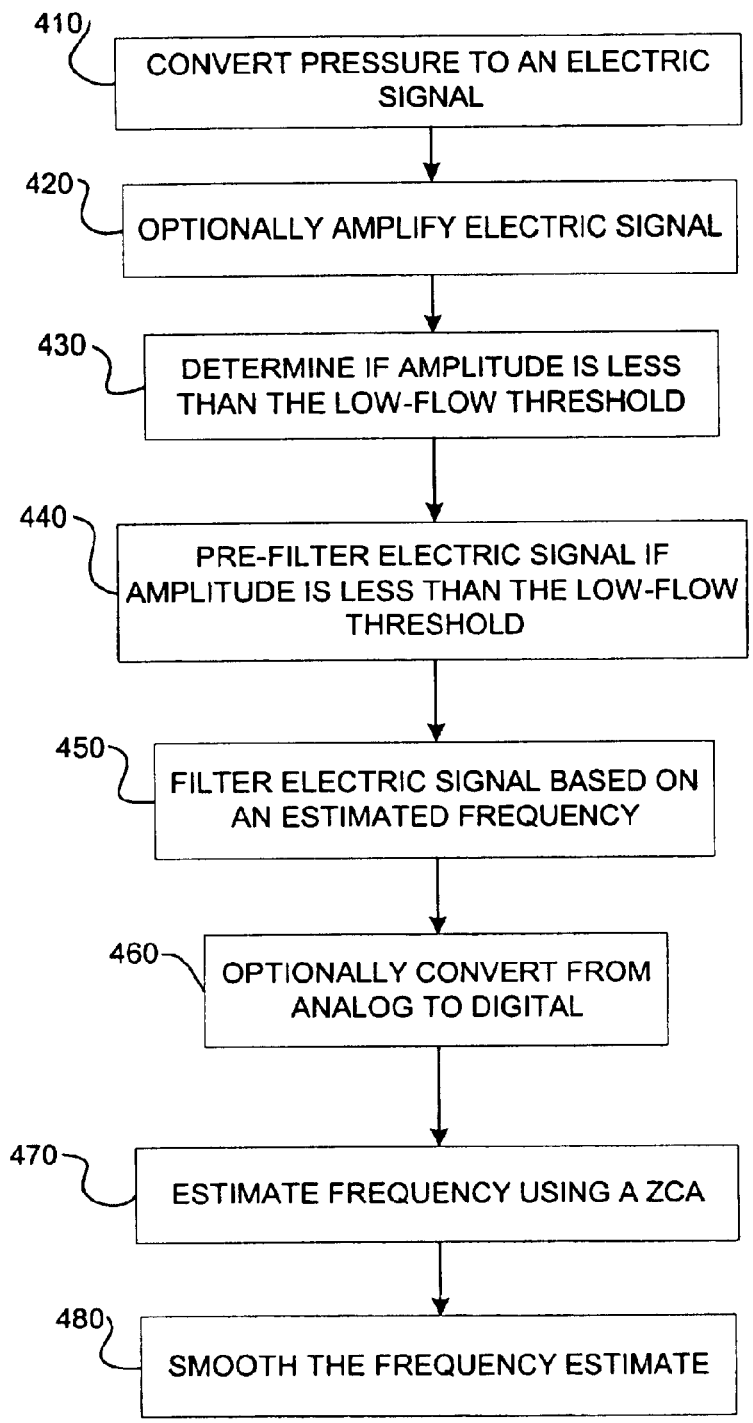
FIG. 4 is a flow chart of a process for propagating a signal through a vortex flow meter having a pre-filter and an amplitude detector.

Referring to FIG. 4, a process 400 for propagating a signal through a vortex flow meter having a pre-filter and an amplitude detector includes converting pressure to an electric signal (410), and optionally amplifying the electric signal (420). The process 400 includes determining if the amplitude of the electric signal is less than a low-flow threshold (430), and, if so, filtering the electric signal with a pre-filter (440). The process 400 also includes filtering the electric signal based on an estimated frequency (450), and optionally converting the electric signal from analog to digital (460). Finally, the process 400 includes estimating a frequency of the electric signal using a ZCA (470) and smoothing the frequency estimate (480).

Referring again to FIG. 1, a description of the propagation of a signal through the system 100 maybe used to illustrate an implementation of the process 400. The pressure sensor 110 may be coupled, for example, to a bluff body that produces vortex shedding or to a pipe wall near the bluff body. The pressure sensor 110 senses the pressure variations of the vortex shedding and produces an electric signal referred to as the vortex signal (410). The pre-amplifier 120 amplifies the vortex signal (420) and provides the amplified vortex signal to the pre-filter 130 and the amplitude detector 140.

The amplitude detector 140 determines whether the amplitude of the vortex signal is less than a threshold amplitude (430). As explained earlier, the amplitude of the vortex signal is directly related to the flow rate of the vortex signal. Thus, the threshold amplitude corresponds to a threshold flow rate.

Before the amplitude detector 140 operates, the threshold amplitude is set. The threshold amplitude is the maximum amplitude at which the pre-filter 130 will be enabled, and corresponds to the maximum flow rate at which the pre-filter 130 will be enabled. The threshold amplitude may be chosen to be larger than some measure of the noise on the vortex signal. One measure of the noise may be obtained by using a probability distribution function of the noise to determine a noise value that is expected to be greater than ninety-nine percent of the encountered noise. Such a value is often referred to as a "three-sigma" point. The threshold amplitude may also be chosen such that the corresponding flow rate is higher than the flow rate at which the ZCA empirically begins to fail. The amplitude detector 140 may use a hysteresis loop or other mechanism to inhibit the amplitude detector 140 from oscillating rapidly between enabling and disabling the pre-filter 130.

If the amplitude of the vortex signal is less than the threshold amplitude (430), then the amplitude detector 140 enables the pre-filter 130 (440). Conversely, if the amplitude detector 140 determines that the amplitude of the vortex signal is greater than the threshold amplitude, then the amplitude detector 140 disables the pre-filter 130. When enabled, the pre-filter 130 acts as a BPF and filters out high frequency noise and direct current ("DC") offset arising from the pre-amplifier 120 (440). When disabled, the pre-filter 130 acts as an all-pass filter and has little or no effect on the vortex signal.

Before the pre-filter 130 is enabled, the pass band of the pre-filter 130 is set. One implementation sets the low end of the pass band, $f_{L,PF}$, where PF stands for pre-filter, to one-half of the minimum vortex frequency, and sets the high end of the pass band, $f_{H,PF}$, to the vortex frequency corresponding to the threshold amplitude. The minimum vortex frequency is the minimum frequency at which vortex shedding will reliably occur.

The pass band for the BPF 150 must also be set. Initially, the pass band is set so that the BPF 150 acts as an all-pass filter, having little or no effect on the vortex signal. After the ZCA module 170 has estimated the vortex frequency, the ZCA module 170 provides the estimated vortex frequency to the BPF 150 and the BPF 150 as a filter setting establishes a pass band around the estimated vortex frequency. The pass band may be set in a variety of ways. One implementation sets the low end of the pass band, $f_{L,BPF}$, to one-half of the estimated vortex frequency, and sets the high end of the pass band, $f_{H,BPF}$, to twice the estimated vortex frequency. These settings provide for a narrower band at low frequencies than at high frequencies, which corresponds to a narrower band at low flow rates than at high flow rates.

After the pass band is established around the estimated vortex frequency, the BPF 150 may filter the vortex signal using the pass band (450). The ADC 160 converts the filtered vortex signal from an analog signal to a digital signal (460). The output of the ADC 160 is provided to the ZCA module 170 and may be binary or have a higher number of discrete levels.

The ZCA module 170 may include functionality intended to reject noise. Such functionality may include, for example, using a hysteresis loop or other mechanism to inhibit the ZCA module 170 from recognizing zero crossings caused by noise. For example, a Schmitt Trigger or other device with built-in hysteresis may be used. In one implementation, the noise-rejecting mechanism uses a hysteresis value, $h_{ZCA}$, to produce a binary output of either a higher value or a lower value. The noise-rejecting mechanism may produce a transition from the higher value to the lower value if the input is below a negative value that has an absolute value greater than $h_{ZCA}$. Conversely, the noise-rejecting mechanism may produce a transition from the lower value to the higher value if the input is greater than $h_{ZCA}$. Each such transition may indicate a zero crossing for the vortex signal. Other implementations may operate differently, such as, for example, by using different hysteresis values for one or more of the two transitions, or by transitioning upon different conditions.

The ZCA module 170 continues to estimate the vortex frequency (470) and provides filter settings to the BPF 150. As explained above, the filter settings provided may include an estimated vortex frequency.

The ZCA module 170 provides the estimated vortex frequency to the smoothing filter 180. The smoothing filter

180 smoothes the estimates of the vortex frequency to produce a smoothed frequency estimate (480).

Referring again to FIG. 3, the propagation of a signal through the system 300 may be used to illustrate a variation of the process 400 in which the analog-to-digital conversion occurs earlier than that specified in the process 400. The pressure sensor 310 converts pressure to an electric vortex signal (410) that is provided to the pre-amplifier 320 which amplifies the electric vortex signal (420). The ADC 360 converts the amplified electric vortex signal to a digital signal (460). The amplitude detector 340 determines if the amplitude of the digital signal is less than a low-flow threshold (430), and controls the pre-filter 330 to filter the digital signal if the amplitude is less than the low-flow threshold (440). The BPF 350 filters the digital signal based on an estimated frequency from the ZCA module 370 (450). The ZCA module 370 optionally performs a noise-rejecting function and uses a zero crossing algorithm to estimate the vortex frequency (470). Finally, the smoothing filter 380 smoothes the estimated vortex frequency (480).

Figure 5:
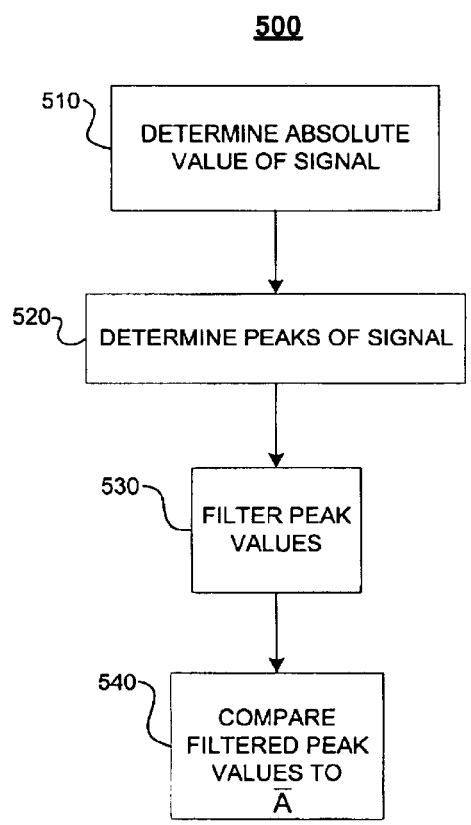
FIG. 5 is a flow chart of a process for determining if a vortex signal has an amplitude that is less than a threshold amplitude.

Referring to FIG. 5, a process 500 for determining if a vortex signal has an amplitude that is less than a threshold amplitude includes determining the absolute value of the vortex signal (510), and determining the peak values of the absolute value vortex signal (520). The process 500 includes filtering the peak values (530) and comparing the filtered peak values to the threshold amplitude (540).

Referring again to FIG. 2, a description of the propagation of a signal through the system 200 may be used to illustrate an implementation of the process 500. The absolute value converter 210 determines the absolute value of the input vortex signal (510), and the peak detector 220 determines the peaks of the converted vortex signal (520). The LPF 230 filters the peak values (530). Finally, the comparator 240 compares the filtered peak values to the threshold amplitude (540) to determine whether the threshold has been met.

The comparator 240 may use a hysteresis loop or other mechanism to inhibit rapid oscillations between enabling and disabling the pre-filter 130. In one such implementation, a hysteresis value, $h_C$, is used and the comparator 240 only transitions to the state of enabling the pre-filter 130 (from a state of having the pre-filter 130 disabled) if the detected amplitude falls below A-bar minus $h_C$. Similarly, in that implementation, the comparator 240 only transitions to the state of disabling the pre-filter 130 (from a state of having the pre-filter 130 enabled) if the detected amplitude rises above A-bar plus $h_C$. Other implementations may use different hysteresis values for one or more of the two transitions.

Figure 6:
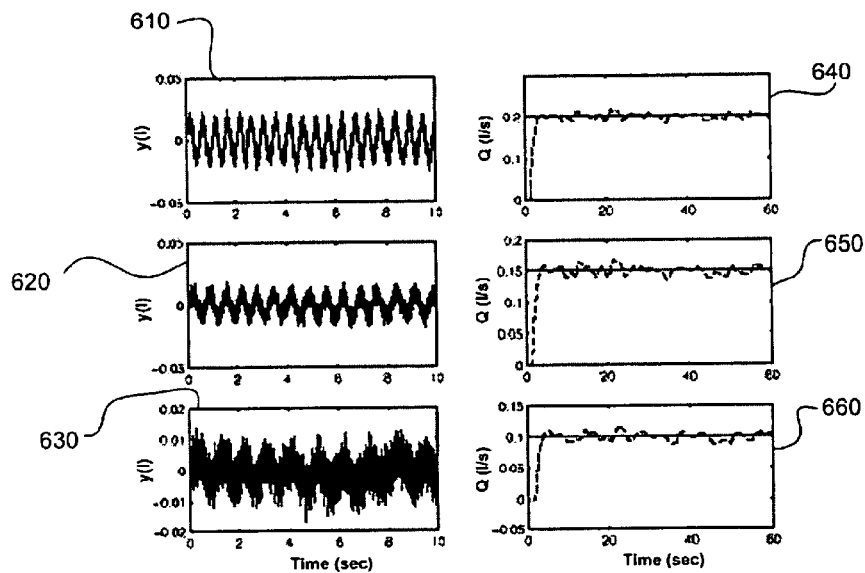
FIG. 6 is a set of graphs providing simulation data for a start-up at a low flow rate of a vortex flow meter having a pre-filter.

FIG. 6 shows simulation data indicating that various implementations of the system 300 may increase the ability of a vortex flow meter to lock on to a low-flow-rate vortex signal at start-up. For example, if the system 300 is started with a low flow rate, it may be difficult for the ZCA module 370 (acting without the amplitude detector 340 and the pre-filter 330) to lock on to the vortex signal. That is, the ZCA module 370 may be unable to detect the zero crossings that are due to the vortex signal, as opposed to noise. Until a frequency is estimated, the BPF 350 may be acting as an all-pass filter and may not be filtering any noise, and the ZCA module 370 may continue to have the same level of noise. The amplitude detector 340, however, may be able to more accurately detect that the flow rate is low, and may enable the pre-filter 330 to assist the ZCA module 370 in locking on to the vortex signal.

As shown in FIG. 6, the input vortex signals of graphs 610–630 each reflect start-up of a noisy system at a low flow rate. The flow rates decrease from 0.2 liters/second ("l/s") to 0.1 l/s as shown in graphs 640–660, while the noise increases as shown in graphs 610–630. In each case, however, the system produces accurate estimates of the flow rates, as indicated in the graphs 640–660.

Figure 7:
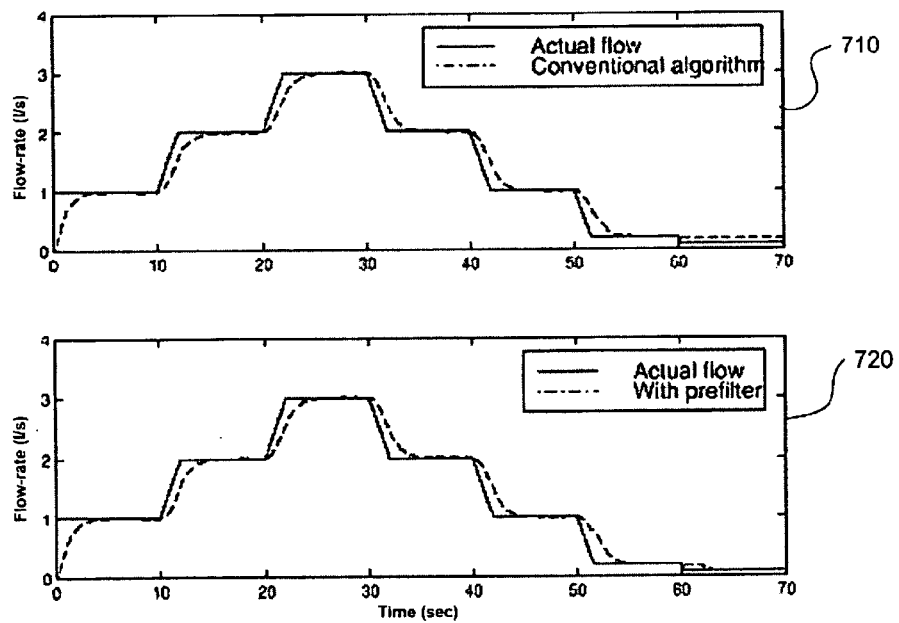
FIG. 7 is a set of graphs providing data from a first simulation as a flow rate is varied and decreased to a low flow rate.
Figure 8:
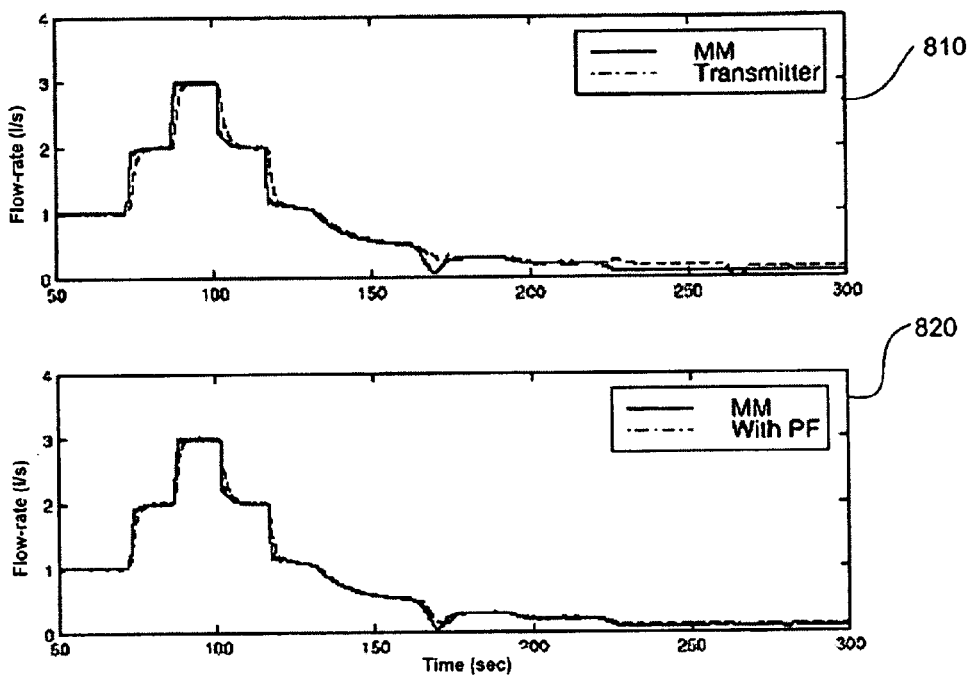
FIG. 8 is a set of graphs providing data from a second simulation as a flow rate is varied and decreased to a low flow rate.

FIGS. 7 and 8 show simulation and real data, respectively, indicating that various implementations of the system 300 may increase the ability of a vortex flow meter to track a vortex signal from higher flow rates to lower flow rates where the SNR is lower. For example, the ZCA module 370 (acting without the amplitude detector 340 and the pre-filter 330) may have difficulty detecting zero crossings attributable to a vortex signal, as opposed to zero crossings attributable to noise, as the flow rate decreases. The amplitude detector 340, however, may be able to recognize that the flow rate is decreasing and enable the pre-filter 330 to assist the ZCA module 370 to track the vortex signal as the flow rate decreases.

Referring to the simulation data in FIG. 7, a graph 710 shows that a particular conventional ZCA that tracks the actual flow rate down to 0.2 l/s does not track the flow rate down to 0.1 l/s. However, a graph 720 shows that coupling the same conventional ZCA to a pre-filter, such as the pre-filter 330, permits the vortex flow meter to track the actual flow rate down to 0.1 l/s.

Details of the simulation associated with FIG. 7 are now discussed. The simulation used a test system substantially the same as the system 300 to produce the trace labeled "With prefilter" in the graph 720. The simulation produced the trace labeled "Conventional algorithm" in the graph 710 by omitting the amplitude detector and the pre-filter from the test system. Other implementations of the simulation associated with FIG. 7 may use different systems and/or parameters.

A vortex flow meter is used that has the following three characteristics. First, the meter has a K-factor of 9.45171 inverse liters ("$l^{-1}$"). The K-factor is generally constant for a given flow meter, and the vortex frequency equals the flow rate multiplied by the K-factor. Second, the meter has an amplitude flow ratio ("AFR") of 0.356. The AFR is a constant for a given flow meter size and fluid density, and the amplitude of the vortex signal equals the square of the flow rate multiplied by the AFR. If the fluid is compressible and may have a changing density, temperature and pressure can be measured or estimated and used to determine the density, and the AFR can be adjusted accordingly. Standard equations relating these variables may be used. Third, the meter is a two-inch meter having a minimum reliable vortex frequency of one Hertz ("Hz").

The flow rate is varied in the simulation between 0.1 l/s to 3.0 l/s, as indicated in FIG. 7. Accordingly, the corresponding ranges for amplitude and frequency can be determined. Using the AFR, the amplitude of the vortex signal varies between 3.56 millivolts ("mV") and 3.20 volts ("V"). Using the K-factor, the vortex-shedding frequency varies between 1 Hz and 30 Hz.

Plant noise is assumed to be white Gaussian with zero mean and variance of 1*10E-5 for all values of the flow rate. Accordingly, the three-sigma point, which is the ninety-nine percent confidence interval, is approximately 0.01.

A hysteresis value, $h_{ZCA}$, for a ZCA module of the test system is selected to be greater than the three-sigma point of the plant noise. A value of 0.012 V is used. Accordingly, the ZCA module is expected to fail for amplitude values that fall below 0.012 V. Using the AFR, the flow rate corresponding to an amplitude of 0.012 V is approximately 0.2 l/s.

A pre-filter of the test system is configured so that it switches on below a Reynolds number of 10,000. The Reynolds number ("Re") is equal to the fluid velocity ("vel") times the diameter of the pipe line ("diam") divided by the viscosity of the fluid ("visc"), or Re=vel*diam/visc.

Q-bar is related to Re by the following equation, Q-bar= (25*pi/4)(visc*S*Re), where S is the size of the flow meter in inches. For S=2 and visc=1*10E-6 (the viscosity of water), Q-bar is approximately 0.4 l/s. Alternatively, Q-bar can be selected to be about 0.4 l/s, and Re can be determined from Q-bar. In either case, the pre-filter will be switched on at a threshold flow rate of 0.4 l/s, which, using the AFR, corresponds to a threshold amplitude of 0.057 V.

A hysteresis value, $h_C$, for an amplitude detector of the test system can also be selected as the three-sigma point of the plant noise. Thus, $h_C$ can be set to 0.012 V. Other implementations may set one or more of the hysteresis values to some fraction, such as, for example, one-third, of the expected vortex signal amplitude.

The low end of the pass band for the pre-filter is selected to be one-half of the minimum reliable vortex frequency, $f_{L,PF}$, or 0.5 Hz. The high end of the pass band for the pre-filter, $f_{H,PF}$, is selected to be the frequency corresponding to the threshold flow rate, which, using the K-factor, is approximately 4 Hz. Other implementations may select the high end of the pass band to be somewhat higher so as to reduce the chance of filtering out the vortex signal if the vortex frequency is equal to or near the threshold frequency.

When the pre-filter is switched on, the pre-filter removes some of the noise and will enable the ZCA module to track the vortex frequency down to 0.1 l/s. A flow rate of 0.1 l/s corresponds to an amplitude of 0.00356 V, which is smaller than the hysteresis value, $h_{ZCA}$, in the ZCA module. Accordingly, $h_{ZCA}$ is modified to be smaller than 0.00356, and a value of 0.001 is selected. The ZCA module may therefore have a different hysteresis value when the pre-filter is enabled. The ZCA module may have multiple hysteresis values, or even a continuously changing hysteresis value, depending, for example, on the size and location of the pass band of a BPF of the test system.

A smoothing filter of the test system is assumed to have a time constant of one second.

As the graph 720 illustrates, the simulation tracks the flow rate down to 0.1 l/s. This reflects an increase in the meter's turn-down ratio by a factor of two. The turn-down ratio reflects the range of flow rates that a meter can measure. Assuming that the meter, without the pre-filter, could measure flow rates between 0.2 l/s and 10 l/s, the meter would have a turn-down ratio of fifty (10 divided by 0.2). With the pre-filter, the turn-down ratio of the meter is improved to one hundred.

The above data demonstrates that the cascaded filters of the test system, that is, the pre-filter and the BPF, need not have nested pass bands for all frequencies at which both filters are enabled. For example, just below a flow rate of 0.4 l/s, the pre-filter of the test system has a fixed pass band of 0.5 Hz to 4 Hz and the BPF has a pass band of approximately 2 Hz to 8 Hz. These pass bands overlap, but are not nested. At a flow rate of 0.15 l/s, however, the BPF has a pass band of approximately 0.75 Hz to 3 Hz, which is nested within the pass band of the pre-filter.

In particular implementations, the pass band of a pre-filter may be nested within the pass band of a BPF for particular frequencies at which both filters are enabled. For example, if the pass band of the BPF is designed to extend from one-fourth the estimated frequency to four times the estimated frequency, then at a flow rate of 0.15 l/s, the BPF has a pass band of approximately 0.375 Hz to 6 Hz. At that flow rate, and assuming that the pass band of the pre-filter is calculated as above, then the pass band of the pre-filter is 0.5 Hz to 4 Hz, which is nested entirely within the pass band of the BPF. However, assuming a triggering flow rate of 0.4 l/s, the pass band of the BPF is approximately 1 Hz to 16 Hz and the pass band of the pre-filter (0.5 Hz to 4 Hz) overlaps this range (1 Hz to 16 Hz) but is not nested within it.

Implementations may provide for different configurations of the pass bands of included filters, such as, for example, having one pass band nested within another over an entire range for which the filters are enabled. A filter's pass band may also be varied in other ways, such as, for example, by increasing the pass band when the estimated vortex frequency changes. By increasing a pass band in this manner, a filter may be less likely to shift a narrow pass band onto a noise spur and filter out the vortex frequency.

The real data in FIG. 8 provides results that are similar to the results of the simulation data in FIG. 7. A graph 810 shows that a particular conventional ZCA is unable to track the flow rate down past 0.2 l/s. As with the simulation data in the graph 710, the real data in the graph 810 shows that the conventional ZCA continues to output a value of approximately 0.2 l/s even when the flow rate has dropped to 0.1 l/s. This may be due, for example, to the behavior of a BPF, and illustrates one example of the unreliability of the conventional ZCA at low flow rates. Analogous to the graph 720, a graph 820 shows that coupling the same conventional ZCA to a pre-filter, such as the pre-filter 330, permits the vortex flow meter to track the actual flow rate down to 0.1 l/s. The actual flow rate is taken to be the flow rate indicated by a reliable flow meter, labeled as "MM" in the legends of the graphs 810 and 820.

Figure 9:
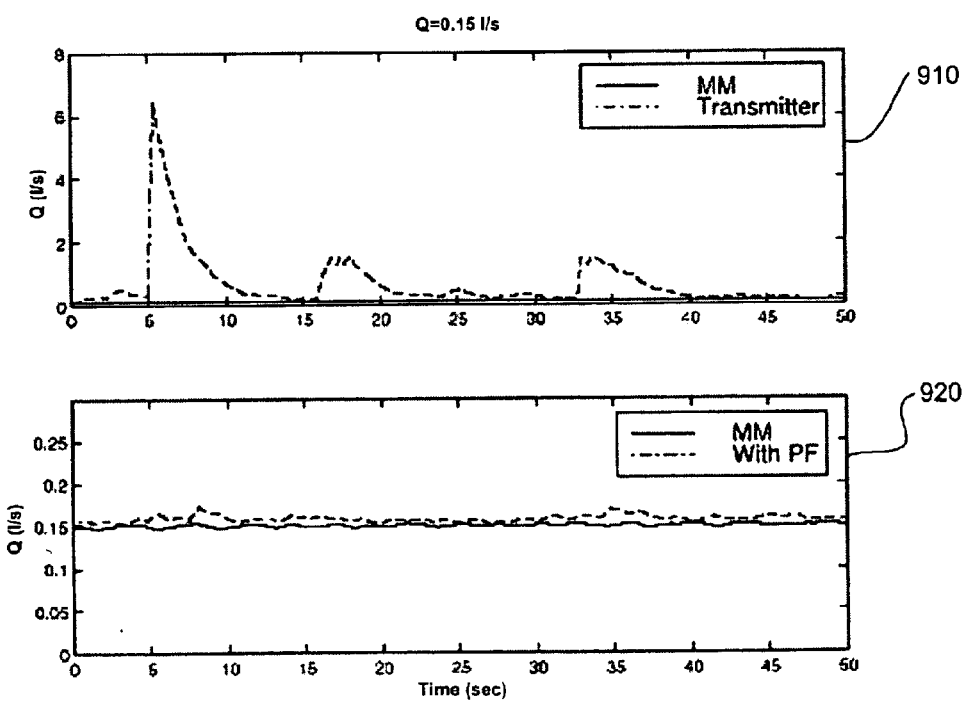
FIG. 9 is a set of graphs providing simulation data at a low flow rate as noise spurs are introduced.

FIG. 9 shows real data indicating that various implementations of the system 300 may increase the ability of a vortex flow meter to continue to track a vortex signal at a low flow rate in the presence of noise. For example, even if the ZCA module 370 (acting without the amplitude detector 340 and the pre-filter 330) locks on to or tracks a low flow-rate vortex signal, large noise spurs may cause zero crossings that the ZCA module 370 improperly attributes to the vortex signal. The pre-filter 330, however, which would presumably be enabled at the low flow rate, may filter out the large noise spurs sufficiently to prevent a zero crossing. Even if the ZCA module 370 (acting without the amplitude detector 340 and the pre-filter 330) were to recover and start tracking the signal again after improperly recognizing a zero crossing caused by a large noise spur, the flow meter may produce inaccurate flow values during the time required for recovery.

A graph 910 shows that at a flow rate of 0.15 l/s, a particular conventional ZCA follows a large noise spur at approximately five seconds on the time axis. The ZCA may be said to be tracking the noise spur or to have lost lock. The graph 910 reveals that it takes the ZCA approximately five seconds, until approximately ten seconds on the time axis, to recover from the noise spur and estimate an accurate flow rate. Additional spurs at approximately sixteen seconds and thirty-three seconds also cause the ZCA to mis-estimate the vortex frequency. A graph 920 shows that coupling the same conventional ZCA to a pre-filter, such as the pre-filter 330, permits the vortex flow meter to track the actual flow rate despite the presence of the noise spurs. As in FIG. 8, the actual flow rate is taken to be the flow rate indicated by a reliable flow meter, labeled as "MM" in the legends of the graphs 910 and 920.

Details of the system associated with the real data of FIGS. 8 and 9 are now discussed. A test system substantially the same as the system 300 was used to produce the traces labeled "With PF" in the graphs 820 and 920. The traces labeled "Transmitter" in the graphs 810 and 910 were produced with a conventional vortex flow meter that does not include an amplitude detector and a pre-filter. In both the test system and the conventional vortex flow meter, substantially all of the functionality occurring after the pre-amplifier stage is performed by a digital signal processor ("DSP") chip or chip set. Other systems may use one or more discrete components. The conventional vortex flow meter may allow the analog data from a pressure sensor or a pre-amplifier to be tapped. Using such a tap as an input, the test system may produce the real data in the "With PF" traces of the graphs 820 and 920.

Noise immunity may be further enhanced because, after the flow rate is determined to be low, the systems 100–300 may assume that the flow rate will not change quickly, which allows the systems to use the LPF 230 or a digital equivalent which may filter out large noise spurs and/or other higher-frequency noise. Implementations may also use a hysteresis loop to filter out noise in the determination of the amplitude. These features may inhibit the amplitude detectors 140 and 340 from improperly disabling the pre-filters 130 and 330, and may thereby increase the robustness of the amplitude detectors 140 and 340. The robustness of the amplitude detectors 140 and 340 may be further enhanced by the fact that the amplitude detectors 140 and 340 may be concerned only with detecting a range of low flow rates, and, therefore, may not be concerned with amplitude changes that do not put the amplitude out of that range. Conversely, the ZCA modules 170 and 370 may be concerned about every change in frequency.

Additional Examples

Figure 10:
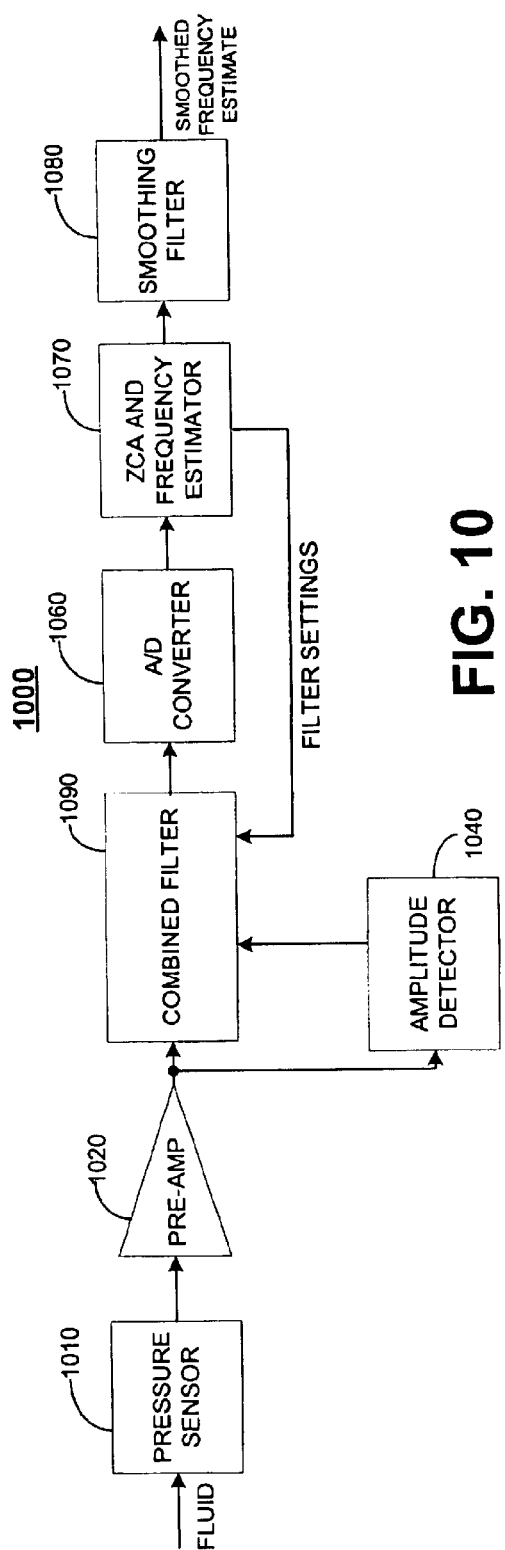
FIG. 10 is a block diagram of an example of a vortex flow meter having a combined pre-filter and band-pass filter.

Referring to FIG. 10, a system 1000 may be used as a vortex flow meter to measure flow rate using the vortex shedding principle. The system 1000 includes a pressure sensor 1010 that corresponds to the pressure sensor 110 and provides an output to a pre-amplifier 1020 that corresponds to the pre-amplifier 120. The output of the pre-amplifier 1020 is provided to an amplitude detector 1040 that corresponds to the amplitude detector 140. The output of the pre-amplifier 102 is also provided to a combined filter 1090 that is controlled, at least in part, by the output of the amplitude detector 1040. The combined filter 1090 filters an input signal and provides an output to an ADC 1060 that corresponds to the ADC 160. The ADC 1060 provides an output to a ZCA module 1070 that corresponds to the ZCA module 170. One output of the ZCA module 1070 provides a filter setting to the combined filter 1090, and another output of the ZCA module 1070 is provided to a smoothing filter 1080 that corresponds to the smoothing filter 180. The corresponding components of the systems 100 and 1000 are not necessarily identical and need not include the same functionality.

The combined filter 1090 may perform the same, or different, filtering functions from those performed by the pre-filter 130 and the BPF 150. In one implementation, the combined filter 1090 performs the same functions, acting as a two-mode filter. In the first mode, only the filtering of the BPF 150 is performed by the combined filter 1090. In the second mode, the filtering of both the BPF 150 and the pre-filter 130 is performed by the combined filter 1090. Such a combined filter 1090 may consist, for example, of a filter module having only a single filter architecture or a filter module including two separate filters. Other implementations of the combined filter 1090 only perform the filtering of the pre-filter 130, ignoring the feedback provided by the ZCA module 1070. Still other implementations of the combined filter 1090 perform the filtering of a single BPF with a single pass band being controlled by both the amplitude detector 1040 and the ZCA module 1070.

Figure 11:
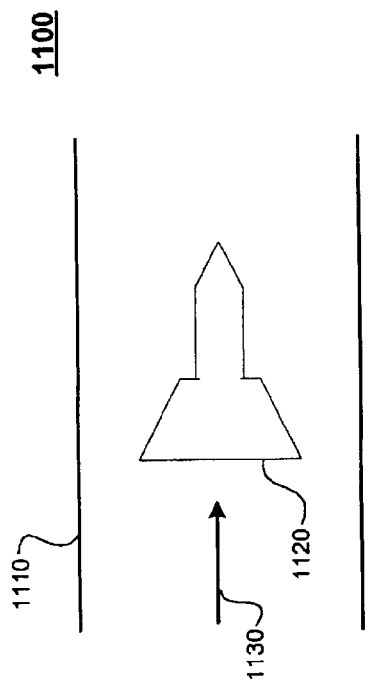
FIG. 11 is an axial cross-sectional view of an example of a bluff body in a pipe.

Referring to FIG. 11, a system 1100 illustrates a longitudinal cross-section of a pipe 1110 containing a bluff body 1120 that induces vortex shedding in a fluid flowing in the pipe 1110. An arrow 1130 indicates the direction of flow.

Additional Variations

Referring again to FIG. 1, the pressure sensor 110 may include, for example, a differential pressure sensor or an absolute pressure sensor, and may include materials such as, for example, a piezoelectric material. Thus, one example of a pressure sensor is a piezoelectric differential pressure sensor. The pre-amplifier 120 may include, for example, an electronic component that amplifies an electric signal, or a component designed to work with signals such as, for example, electromagnetic and optical signals. The pre-filter 130 may include, for example, a BPF and a LPF. The BPF 150, as well as other filters, may include, for example, an electronic filter or filtering module in which the range of frequencies that are passed is fixed or can be set by a user. The BPF 150 may include filters designed for electric, electromagnetic, optical, or other signals. The ADC 160 may include, for example, a converter designed to work with electric, electromagnetic, optical, or other signals. The noise-rejecting mechanism described as being part of the ZCA module 170 may also, or alternatively, be incorporated in the ADC 160. One example is a Schmitt Trigger. The ZCA module 170 may include, for example, a device capable of detecting transitions in a signal, or a comparator capable of comparing a signal to a known value such as zero. The ZCA module 170 may also include a processor, an arithmetic unit, a switch, a relay, or another device capable of determining the time between zero crossings and the corresponding frequency. Further, the ZCA module 170 may include one or more additional components, such as a comparator or a logic device, to implement a hysteresis loop. The same, or different, component(s) may be used to perform the zero crossing detection and the frequency estimation. The smoothing filter 180 may include, for example, a LPF, a BPF, or another filter or filtering module capable of smoothing the frequency estimates.

Various ones of the components 110–180 in the system 100 may be omitted or moved. For example, the ADC 160 may be moved so that it is after the ZCA module 170, the smoothing filter 180, or the pre-amplifier 120 as in FIG. 3, or may be omitted altogether. Further, pre-amplification may not be needed in all implementations or may be needed at different, and potentially multiple, points in an implementation. As discussed earlier, the pre-filter 130 and the BPF 150 may be combined in various ways. Additional filters may also be desired in various locations of an implementation. Further, another component, such as, for example, a resistor, a capacitor, an isolator, or an operational amplifier, may be desired in one or more of various locations of an implementation.

Referring again to FIG. 2, the absolute value converter 210 may include, for example, a rectifier or another device capable of providing the absolute value of a signal. ADC component may be subtracted from the input to the absolute value detector 210 before the absolute value is determined. The peak detector 220 may include, for example, a comparator or a slope detector. The peak detector 220 may detect a relative minimum and maximum without regard for whether the value is positive or negative and may also compute the difference between a successive relative-maximum (peak) and relative-minimum (valley) if a DC component is present. The comparator 240, and other comparators, may include, for example, an electronic comparator, a subtractor, a processor, a relay, a switch, or another device capable of comparing two values. Further, the comparator 240 may include one or more additional components, such as, for example, a comparator and a logic device or circuit, to implement a hysteresis loop. The output of the peak detector 220, the LPF 230, or the comparator 240 may be referred to equivalently as, for example, a detected amplitude or an estimated amplitude.

Various ones of the components 210–240 in the system 200 may be omitted or moved. For example, the absolute value converter 210 may be omitted or moved to the location after the peak detector 220. The LPF 230 may be placed before the peak detector 220 or may be omitted altogether. The function of the comparator 240 may be integrated into another device, such as, for example, the peak detector 220 or the pre-filter 130. An additional component, such as, for example, a filter, a resistor, a capacitor, an isolator, or an operational amplifier, may be desired in one or more of various locations of an implementation.

The amplitude detector 140 may operate in a different manner than that previously described. For example, the input signal may be compared to the threshold amplitude without taking the absolute value, detecting the amplitude, and/or filtering. In such an implementation, a relay, a switch, or another comparator may be used, with or without hysteresis, to directly turn the pre-filter 130 on or off. As another example, a "square-law" method may be used that includes squaring the signal and then filtering the squared signal. These methods may be used in either analog or digital implementations.

Referring again to FIG. 3, the functionality of the ADC 360, the amplitude detector 340, the pre-filter 330, the BPF 350, the ZCA module 370, and the smoothing filter 380 may be performed using, for example, discrete components, programmable logic devices, DSPs, or other processors. One or more additional components may also be added, as indicated above for the systems 100 and 200. The system 300 may also include additional functionality, such as, for example, a user interface to a DSP or other device allowing modification of various parameters for operational, testing, or other purposes.

Various operations in the processes 400 and 500 may be performed in different orders or eliminated altogether. Some examples are provided by examining the variations discussed for the systems 100–300.

The simulation and real data provided in FIGS. 6–9 is not intended to be limiting. The data illustrates certain features of various implementations. The features may be illustrated by other implementations and need not be illustrated by all implementations.

The system 1000 may be modified in a variety of ways, such as, for example, those described for the systems 100–300.

A number of implementations have been described. Nevertheless, it will be understood that various modifications may be made. For example, the components of the described systems may generally be implemented in either analog or digital technology, or a combination of the two. Additionally, the components of the described systems may generally be interchanged, as may the operations of the described methods. Accordingly, other implementations are within the scope of the following claims.

What is claimed is:

1. A signal processor for use with a zero crossing module of a vortex flow meter, the signal processor comprising:
   a peak detector operable to produce an amplitude estimate;
   a comparator coupled to the peak detector and operable to receive the amplitude estimate and a threshold amplitude, wherein the comparator is operable to compare the amplitude estimate and the threshold amplitude and to produce a comparison result; and
   a filter module coupled to the comparator and operable to receive the comparison result and a signal, wherein the filter module is operable to selectively filter the signal based on the comparison result and to provide the selectively filtered signal to a zero crossing module.

2. The signal processor of claim 1, further comprising a peak filter disposed between lime peak detector and the comparator, the peak filter being operable to filter the amplitude estimate produced by the peak detector and to produce a filtered amplitude.

3. The signal processor of claim 1, wherein:
   the comparator is operable to produce a comparison result indicative of whether the amplitude estimate is less than she threshold amplitude, and
   the filter module is operable to filter the signal using a first pass band if she comparison result indicates that the amplitude estimate is less than the threshold amplitude.

4. The signal processor of claim 3, wherein the filter module is further operable to filter the signal using a second pass band if the first pass band is not used.

5. The signal processor of claim 3, wherein the filter module is further operable to filter the signal using a second pass band regardless or whether the signal is filtered using the first pass band.

6. The signal processor of claim 5, wherein the second pass band comprises a variable pass band that depends on an estimated vortex frequency of the signal.

7. The signal processor of claim 5, wherein:
   the filter module comprises a first filter and a second filter, the first filter being coupled to the second filter,
   the first filter is operable to selectively filter the signal using the first pass band, and
   the second filter is operable to selectively filter the signal using the second pass band.

8. A vortex flow meter comprising:
   a peak detector operable to produce an amplitude estimate;
   a comparator coupled to the peak detector and operable to receive the amplitude estimate and a threshold amplitude, the comparator being further operable to compare the amplitude estimate and the threshold amplitude and to produce a comparison result;
   a filter module coupled to the comparator, the filter module comprising at least one filter and being operable to receive the comparison result and a signal, to selectively-filter the signal based on the comparison result, and to provide as an output the selectively filtered signal; and
   a frequency estimation module coupled to the filter module, comprising a zero crossing detector and a frequency estimator, the frequency estimation module being operable to receive the selectively-filtered signal, to detect zero crossings in the selectively-filtered signal, and to estimate a vortex frequency of the selectively-filtered signal based on the detected zero crossings.

9. The vortex flow meter of claim 8, further comprising a peak filter disposed between the peak detector and the comparator, the peak filter being operable to filter the amplitude estimates produced by the peak detector and to produce a filtered amplitude estimate.

10. The vortex flow meter of claim 8, wherein:

the comparator is operable to produce a comparison result indicative of whether the amplitude estimate is less than the threshold amplitude, and the filter module is operable to filter the signal using a first pass band if the comparison result indicates that the amplitude estimate is less than the threshold amplitude.

11. The vortex flow meter of claim 10, wherein the filler module is further operable to filter the signal using a second pass band if the first pass band is not used.

12. The vortex flow meter of claim 10, wherein the filter module is further operable to filter the signal using a second pass band regardless of whether the signal is filtered using the first pass band.

13. A method of processing a vortex signal in a vortex flow meter, the method comprising:

comparing an amplitude of a vortex signal to a threshold amplitude;

producing an indication of whether the amplitude of the vortex signal is less than the threshold amplitude;

filtering the vortex signal using a first pass band only if the amplitude of the vortex signal is less than the threshold amplitude;

filtering the vortex signal using a second pass band if the first pass band is not used;

detecting zero crossings of the filtered vortex signal; and estimating a vortex frequency based on the detected zero crossings.

14. The method of claim 13, wherein the threshold amplitude reflects a low flow rate, such that the vortex signal is filtered using the first pass band only if the flow rate is low.

15. The method of claim 14, wherein the first pass band does not vary with the amplitude of the vortex signal.

16. The method of claim 13, wherein the threshold amplitude is adjusted by a hysteresis value.

17. The method of claim 13, wherein detecting the amplitude of the vortex signal comprises:

detecting peaks of the vortex signal; and filtering the detected peaks to reduce high-frequency components.

18. The method of claim 13, wherein the amplitude of the vortex signal comprises a detected amplitude.

* * * * *